(12) United States Patent
Wang et al.

(10) Patent No.: US 12,712,811 B2
(45) Date of Patent: Aug. 18, 2026

(54) PACKET MATCHING METHOD AND APPARATUS, STORAGE MEDIUM, AND ELECTRONIC DEVICE

(71) Applicant: SANECHIPS TECHNOLOGY CO., LTD., Shenzhen (CN)

(72) Inventors: Siyu Wang, Shenzhen (CN); Fengsong Liu, Shenzhen (CN); Zhihua Zhu, Shenzhen (CN); Hengqi Liu, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 323 days.

(21) Appl. No.: 18/572,948

(22) PCT Filed: Jun. 22, 2022

(86) PCT No.: PCT/CN2022/100564
§ 371 (c)(1),
(2) Date: Dec. 21, 2023

(87) PCT Pub. No.: WO2022/268138
PCT Pub. Date: Dec. 29, 2022

(65) Prior Publication Data

US 2024/0323120 A1 Sep. 26, 2024

(30) Foreign Application Priority Data

Jun. 23, 2021 (CN) ......................... 202110699863.2

(51) Int. Cl.
*H04L 45/7453* (2022.01)

(52) U.S. Cl.
CPC ................................ *H04L 45/7453* (2013.01)

(58) Field of Classification Search
CPC . H04L 45/7453; H04L 45/74591; H04L 9/40; H04L 45/54; H04L 45/745; H04L 63/10; G06F 21/64
See application file for complete search history.

(56) References Cited

U.S. PATENT DOCUMENTS

2016/0191384 A1* 6/2016 Shelar ..................... H04L 45/38 370/392
2018/0270152 A1* 9/2018 Zhao ................... H04L 45/7453
(Continued)

FOREIGN PATENT DOCUMENTS

CN 101577721 A 11/2009
CN 101655861 A 2/2010
(Continued)

OTHER PUBLICATIONS

International Search Report for corresponding application PCT/CN2022/100564 filed Jun. 22, 2022; Mail date Sep. 20, 2022.
(Continued)

*Primary Examiner* — Kiet Tang
(74) *Attorney, Agent, or Firm* — CANTOR COLBURN LLP

(57) ABSTRACT

Embodiments of the present disclosure provide a packet matching method and apparatus, a storage medium, and an electronic device. The method includes: determining multiple Hash calculation results corresponding to a key value of a packet; indexing addresses in multiple counter groups respectively according to the multiple Hash calculation results, so as to determine multiple counters, wherein one counter is indexed in one counter group; determining one target counter from the multiple counters; acquiring a target entry at a corresponding position of an off-chip memory according to the address of the target counter; in a case
(Continued)

where the target entry is equal to the key value, determining that the packet matches the target entry.

18 Claims, 4 Drawing Sheets

(56) References Cited

U.S. PATENT DOCUMENTS

| | | | | |
|---|---|---|---|---|
| 2019/0294836 | A1 | 9/2019 | Hegde | |
| 2019/0303762 | A1* | 10/2019 | Sui | G06N 3/063 |

FOREIGN PATENT DOCUMENTS

| | | | |
|---|---|---|---|
| CN | 105786718 | A | 7/2016 |
| CN | 112445720 | A | 3/2021 |

OTHER PUBLICATIONS

Haoyu Song et al., “Fast hash tab le lookup using extended bloom filter”, Applications, Technologies, Architectures, and Protocols for Computer Communications, Aug. 22, 2005, pp. 181-192, XP058144788, DOI: 10.1145/1080091.1080114.

Li Dagang et al., “Deterministic and Efficient Hash Table Lookup Using Discriminated Vectors”, 2016 IEEE Global Communications Conference (GLOBECOM), IEEE, Dec. 4, 2016,, pp. 1-6, XP033058458, DOI: 10.1109/GLOCOM.2016.7841732, Retrieved on Feb. 2, 2017.

Mitzenmacher et al, “Adaptive Cuckoo Filters”, arxiv.org, Oct. 11, 2017, pp. 1-21, XP093188909, Retrieved from Internet: URL:https://arxiv.org/pdf/1704.06818.

Supplementary European Search Report, Application No. EP22827630, Dated Jul. 24, 2024, 2 pages.

Lailong Luo, “Optimizing Bloom Filter: Challenges, Solutions and Comparisons”, arxiv.org, Jan. 7, 2019, pp. 1-37, XP093188888, Retrieved from Internet: URL:https://arxiv.org/pdf/1804.04777.

* cited by examiner

PACKET MATCHING METHOD AND APPARATUS, STORAGE MEDIUM, AND ELECTRONIC DEVICE

CROSS-REFERENCE TO RELATED APPLICATION

The present disclosure is a National Stage Filing of the PCT International Application No. PCT/CN2022/100564 filed on Jun. 22, 2022, which is based on and claims priority to Chinese Patent Application CN 202110699863.2 filed on Jun. 23, 2021 and entitled "PACKET MATCHING METHOD AND APPARATUS, STORAGE MEDIUM, AND ELECTRONIC DEVICE", the disclosure of which is incorporated herein by reference in its entirety.

TECHNICAL FIELD

Embodiments of the present disclosure relate to the field of communications, and in particular, to a packet matching method and apparatus, a storage medium, and an electronic device.

BACKGROUND

In a network processor and a routing device, table lookup efficiency of various table entries, such as Access Control Lists (ACL), routing tables, and Media Access Control (MAC) forwarding tables, has crucial effect on packet forwarding efficiency, and directly affects performance of the entire network. A packet classification method implemented based on hardware has advantages such as a high lookup speed and a stable lookup delay, and is generally widely applied to a high-performance network processing device and forwarding device in the form of a dedicated chip.

At present, exact matching is the simplest type of packet matching method, and the storing and lookup method of the exact matching is usually very simple and efficient. However, with the continuous enlargement of the network scale, the scale of such table entries also increases sharply, for example, the MAC forwarding table composed of table entries requiring only exact matching usually has a capacity over 1G, and the storage overhead occupied by the MAC forwarding table in the chip cannot be ignored. In order to reduce the overall scale of a chip, it is desirable to store table entries in an off-chip dedicated memory, thereby reducing the on-chip memory requirements. The implementation of the off-chip storage requires the improvement on the original algorithm.

In the Hash algorithm of the related art, due to the problem of Hash conflict, a Hash table stored in an off-chip memory may require multiple off-chip accesses to complete one lookup, thereby reducing the lookup efficiency. Even if certain Ternary Content Accessible Memory (TCAM) or register resources are provided for solving partial conflict, so as to ensure that only one entry is stored at each address of the Hash table, the storage efficiency of the Hash table will be greatly reduced, and the capacity of the entries cannot be ensured. A conventional Bloom filter can only provide entry filtering to reduce the probability of invalid accesses to the off-chip memory, but cannot solve inherent problems of lookup efficiency and storage efficiency.

For the problem in the related art that the packet matching algorithm based on on-chip and off-chip structures cannot give enough considerations to lookup efficiency and storage efficiency, no solution has been proposed.

SUMMARY

Embodiments of the present disclosure provide a packet matching method and apparatus, a storage medium, and an electronic device, so as to at least solve a problem in the related art that the packet matching algorithm based on on-chip and off-chip structures cannot give enough considerations to lookup efficiency and storage efficiency.

According to an embodiment of the present disclosure, provided is a packet matching method, including: determining multiple Hash calculation results corresponding to a key value of a packet; indexing addresses in multiple counter groups respectively according to the multiple Hash calculation results, so as to determine multiple counters, wherein one counter is indexed in one counter group; determining one target counter from the multiple counters; acquiring a target entry at a corresponding position of an off-chip memory according to the address of the target counter; in a case where the target entry is equal to the key value, determining that the packet matches the target entry.

According to another embodiment of the present disclosure, provided is a packet matching apparatus, including: a determination module, configured to determine multiple Hash calculation results corresponding to a key value of a packet; an indexing module, configured to index addresses in multiple counter groups respectively according to the multiple Hash calculation results, so as to determine multiple counters, wherein one counter is indexed in one counter group; a selection module, configured to determine one target counter from the multiple counters; a first acquisition module, configured to acquire a target entry at a corresponding position of an off-chip memory according to the address of the target counter; and a matching module, configured to determine, in a case where the target entry is equal to the key value, that the packet matches the target entry.

According to still another embodiment of the present disclosure, provided is a computer-readable storage medium. The computer-readable storage medium stores a computer program, wherein the computer program, when running on a processor, causes the processor to execute the operations in any one of the method embodiments.

According to yet another embodiment of the present disclosure, provided is an electronic device, including a memory and a processor, wherein the memory stores a computer program, and the processor is configured to run the computer program so as to execute the operations in any one of the method embodiments.

DETAILED DESCRIPTION

The embodiments of the present disclosure will be described below in detail with reference to the accompanying drawings and in conjunction with embodiments.

It should be noted that, terms such as 'first' and 'second' in the specification, claims, and accompanying drawings of the present disclosure are used to distinguish similar objects, but are not necessarily used to describe a specific sequence or order.

Figure 1:
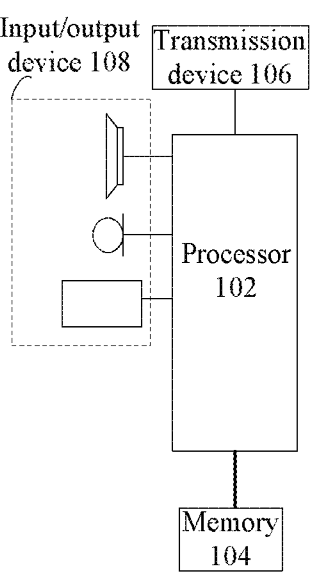
FIG. 1 is a block diagram showing the hardware structure of a mobile terminal for implementing a packet matching method according to an embodiment of the present disclosure.

The method embodiments provided in the embodiments of the present disclosure may be executed in a mobile terminal, a computer terminal or a similar computing device. Taking the operation on the mobile terminal as an example, FIG. 1 is a block diagram showing the hardware structure of a mobile terminal for implementing a packet matching method according to an embodiment of the present disclosure. As shown in FIG. 1, the mobile terminal may include one or more processors 102 (only one is shown in FIG. 1) (the processor 102 may include, but is not limited to, a processing device such as a microprocessor (e.g., Micro-Controller Unit (MCU) or a programmable logic device (e.g., Field Programmable Gate Array (FPGA)), and a memory 104 configured to store data. The mobile terminal may further include a transmission device 106 for conducting a communication function and an input/output device 108. A person having ordinary skill in the art may understand that the structure shown in FIG. 1 is merely exemplary, which does not limit the structure of the foregoing mobile terminal. For example, the mobile terminal may further include more or fewer modules than shown in FIG. 1, or have a different configuration from that shown in FIG. 1.

The memory 104 may be configured to store a computer program, for example, a software program and modules of application software, such as a computer program corresponding to the packet matching method in the embodiments of the present disclosure. The one or more processors 102 run the computer program stored in the memory 104, so as to execute various function applications and service link address pool slicing processing, that is, to implement the foregoing method. The memory 104 may include high-speed random access memory, and may also include non-volatile memory, such as one or more magnetic storage devices, flash memory, or other non-volatile solid-state memory. In some examples, the memory 104 may further include a memory remotely located with respect to the one or more processors 102, and the memory may be connected to the mobile terminal via a network. Examples of such network include, but are not limited to, the Internet, an intranet, a local area network, a mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 can be a Radio Frequency (RF) module for communicating wirelessly with the Internet.

Figure 2:
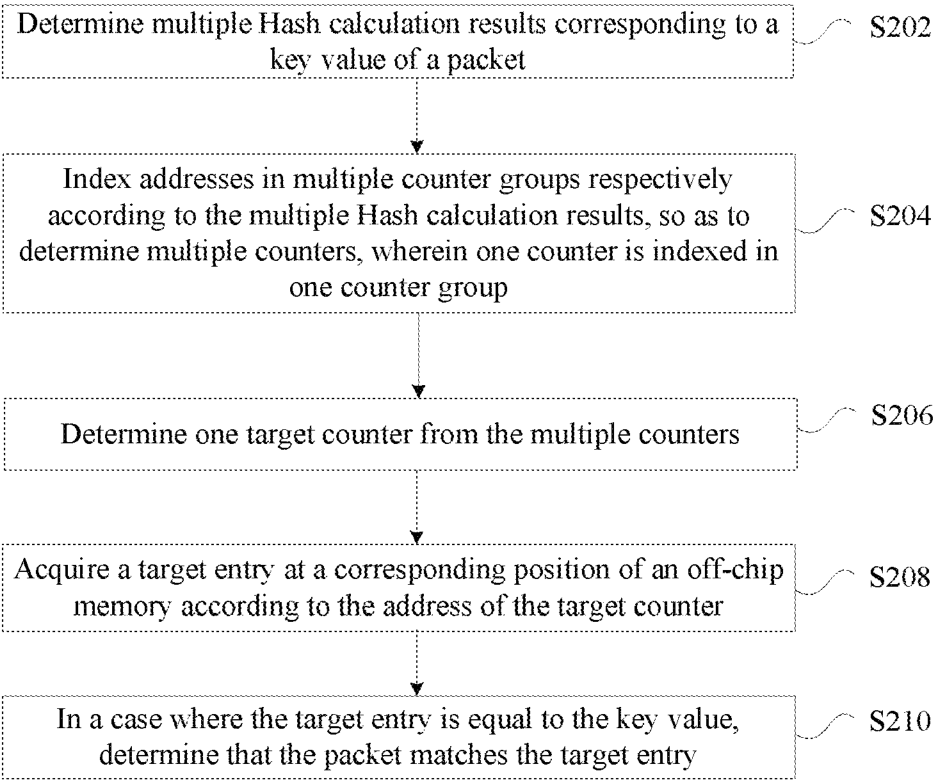
FIG. 2 is a flowchart of a packet matching method according to an embodiment of the present disclosure.

The embodiments of the present disclosure provide a packet matching method running on the described mobile terminal or network architecture, and the packet matching method may be performed by a terminal. The terminal may access a current Master Node (MN) cell and a current Secondary Node (SN) cell of a source region via Dual Connection (DC). FIG. 2 is a flowchart of a packet matching method according to an embodiment of the present disclosure. As shown in FIG. 2, the flow includes the following operations S202 to S210.

At operation S202, multiple Hash calculation results corresponding to a key value of a packet are determined.

In the present embodiment, the foregoing operation S202 may exemplarily include: extracting the key value of the packet; and determining, according to multiple Hash functions preset by a classifier, the multiple Hash calculation results corresponding to the key value, wherein one Hash function is used for determining one Hash calculation result.

At operation S204, addresses in multiple counter groups are respectively indexed according to the multiple Hash calculation results, so as to determine multiple counters, wherein one counter is indexed in one counter group.

At operation S206, one target counter is determined from the multiple counters.

In the present embodiment, the foregoing operation S206 may exemplarily include: sequentially extracting count values of the multiple counters; determining a counter with a smallest count value from the multiple counters; in a case where there is only one counter with the smallest count value, determining the counter with the smallest count value as the target counter; and in a case where there are multiple counters with the smallest count value, determining a unique counter from the multiple counters according to a state of each counter group as the target counter. In the present embodiment, the state of the counter group includes a counter group number, a Hash function number, an address number of the counter in the counter group, and a Hash function result. Exemplarily, a counter with a smallest counter group number or a smallest Hash function number among the multiple counters with the smallest count value may be determined as the target counter, or a counter with a smallest address number in the counter group or a smallest Hash function result among the multiple counters with the smallest count value may be determined as the target counter.

At operation S208, a target entry at a corresponding position of an off-chip memory is acquired according to the address of the target counter.

At operation S210, in a case where the target entry is equal to the key value, it is determined that the packet matches the target entry.

By means of operations S202 to S210, the problem in the related art that the packet matching algorithm based on on-chip and off-chip structures cannot give enough considerations to lookup efficiency and storage efficiency can be solved, thereby greatly improving the lookup rate and stability of packet matching, and also greatly improving the storage utilization rate.

In an exemplary embodiment, before operation S202, the method may further include the following operations S1 and S2.

At operation S1, multiple Hash calculation results of an entry to be inserted are acquired, wherein the multiple Hash calculation results are determined according to multiple Hash functions preset by a classifier, one Hash function is used for determining one Hash calculation result, and one Hash function corresponds to one counter group.

At operation S2, the entry to be inserted is inserted into an empty position in a Hash table according to the multiple Hash calculation results, and the multiple counter groups are maintained, wherein the number of counters contained in each counter group is equal to a capacity of the Hash table, the addresses of counters in each counter group are respectively in one-to-one correspondence with Hash table positions in the Hash table, and the addresses of the counters are the Hash calculation results.

Further, operation S2 may exemplarily include the following operations S21 to S23.

At operation S21, the addresses in the multiple counter groups are indexed according to the multiple Hash calculation results, so as to determine multiple counters, wherein one Hash calculation result corresponds to one counter in one counter group.

At operation S22, one target counter which corresponds to an empty position in the Hash table is selected from the multiple counters.

At operation S23, the entry to be inserted is inserted into the empty position in the Hash table corresponding to the address of the target counter.

In an exemplary embodiment, operation S22 may exemplarily include the following operations S221 and S222.

At operation S221, in a case where the addresses of the multiple counters all correspond to empty positions in the Hash table, one target counter with a smallest count value is selected from the multiple counters.

At operation S222, in a case where the addresses of the multiple counters all correspond to non-empty positions in the Hash table, collision-triggered relocation is executed to acquire one target empty position after the collision-triggered relocation, and a counter corresponding to the target empty position is determined as the target counter.

In an exemplary embodiment, in operation S222, the operation of executing the collision-triggered relocation to acquire one target empty position after the collision-triggered relocation may exemplarily include:

- constructing index trees for entries stored in k positions in the Hash table respectively, so as to acquire k index trees, wherein root nodes of the index trees are linked to k positions in the Hash table corresponding to the Hash calculation results;
- moving a stored entry from the Hash table position corresponding to the root node of one index tree among the k index trees through cuckoo Hashing collision, so as to empty one of the k positions to acquire the target empty position. In an exemplary implementation, the process of moving the stored entry from the Hash table position corresponding to the root node of one index tree among the k index trees through cuckoo Hashing collision, so as to empty one of the k positions to acquire the target empty position includes: starting from the first index tree of the k index trees, repeatedly controlling each index tree to grow a layer of leafs to acquire k−1 leaf nodes, until an empty position is acquired from the leaf nodes, wherein a Hash table position (i.e., a position in the Hash table) corresponding to each leaf node in each index tree is a Hash calculation result acquired by calculating based on an entry stored in a Hash table position corresponding to a parent node of the leaf node, the k−1 leaf nodes respectively correspond to k−1 Hash calculation results other than the Hash calculation result at a current position acquired by calculating based on the entry stored at the position of the parent node of the k−1 leaf nodes; moving the entry stored in the Hash table position corresponding to the parent node to the empty position, so as to empty the Hash table position corresponding to the parent node; in a case where the parent node, serving as a current node, has a parent node, moving an entry stored in a Hash table position corresponding to the parent node of the current node to the empty Hash table position corresponding to the current node; repeating the moving from bottom layer to top layer until the Hash table position corresponding to the root node is empty, so as to acquire the target empty position.

In another exemplary embodiment, in operation S222, the operation of executing the collision-triggered relocation to acquire one target empty position after the collision-triggered relocation may exemplarily further include: according to count values of the k counters corresponding to the entry X to be inserted and other characteristic values of the current states of the counter groups, determining a unique Hash function number and a unique Hash table position, evicting an entry Y stored in the Hash table position, and marking the Hash table position; determining the remaining k−1 Hash calculation results of the entry Y, and in a case where there is an empty position, sequentially moving the entry Y to the empty position; otherwise, according to the count values of the k−1 counters of the entry Y and other characteristic values of the current states of the counter groups, determining a unique Hash function number and a unique Hash table position, and evicting an entry stored in the Hash table position, continuing executing the collision-triggered relocation until an empty position is found, and determining that the position before the entry Y is evicted is the target empty position, wherein during the collision-triggered relocation, the entry is not allowed to be moved to the marked Hash table position.

Exemplarily, when the entry X is inserted, in a case where the positions corresponding to the k Hash function results acquired through calculation based on the entry X are all non-empty positions, collision-triggered relocation is performed; according to the count values of the k counters corresponding to the current entry X and the other state information of possible counter groups, a unique Hash function number and a unique Hash table position are determined, an entry Y stored in the Hash table position is evicted, and the Hash table position is marked; the remaining k−1 Hash function results of the entry Y are calculated; in a case where there is an empty position, the entry Y is sequentially moved to the empty position, and the entry X is moved to the position where the entry Y is originally located; otherwise, according to the count values of the k−1 counters of the entry Y and the other state information of possibly required counter groups, a unique Hash function number and a Hash table position are determined, an entry stored in the Hash table position is evicted, and collision-triggered relocation continues to be executed, wherein during the collision-triggered relocation, the entry is not allowed to be moved to the marked Hash table position and is only allowed to be moved to a new position; the process is repeated until an empty position is found or a predetermined upper limit for collision-triggered relocation is reached.

In another exemplary embodiment, in the foregoing operation S222, maintaining the multiple counter groups may exemplarily include: acquiring a Hash calculation result $H_s(X)$ of a target empty position into which the entry to be inserted is inserted, wherein $1 \leq s \leq k$, and k is the number of the multiple Hash functions; sequentially acquiring the $H_s(X)$-th counter of the s-th counter group to acquire k counters; in a case where the target empty position is able to be uniquely determined according to the count values of the k counters or according to other characteristic values, except the count values, in current states of the k counter groups, determining not to maintain the multiple counter groups; and in a case where the target empty position is not able to be uniquely determined according to the count values of the k counters or according to other characteristic values, except the count values, in the current states of the k counter groups, adjusting the count values of one or more counters, so that the count values of the counters after the adjustment satisfy an entry insertion rule; in a case where insertion of the entry X results in a change of the count value of the counter, checking whether an entry stored in a Hash table position corresponding to the counter whose count value has changed still satisfies the entry insertion rule; in a case where the entry stored in a Hash table position corresponding to the counter whose count value has changed still does not satisfy the entry insertion rule, repeatedly performing the operation of maintaining the counter for the entry stored in the Hash table position corresponding to the counter whose count value has changed, until all entries stored in the positions in the Hash table corresponding to the counters whose count values have changed satisfy the entry insertion rule. The entry insertion rule is: sequentially acquiring the $H_s(X)$-th counter of the s-th counter group to acquire the k counters, wherein $1 \leq s \leq k$, and k is the number of the multiple Hash functions; and determining, according to the count values of the k counters and other characteristic values, except the count values, in the current states of the k counter groups, a unique Hash function number used when storing the entry, and determining a unique storage position of the entry by using the Hash calculation result of the Hash function corresponding to the Hash function number.

Exemplarily, a Hash calculation result $H_s(X)$ of a target empty position into which the entry to be inserted is inserted is acquired, wherein $1 \leq s \leq k$, and k is the number of the multiple Hash functions;

If i<s, and $CG_i[H_i(X)] \leq CG_s[H_s(X)]$, then make $CG_i[H_i(X)] = CG_s[H_s(X)]+1$, wherein $CG_i[H_i(X)]$ is the count value of the counter corresponding to the Hash calculation result acquired by calculating based on the entry to be inserted according to the i-th Hash function, and $CG_s[H_s(X)]$ is the count value of the counter corresponding to the Hash calculation result acquired by calculating based on the entry to be inserted according to the s-th Hash function.

If i>s, and $CG_i[H_i(X)] < CG_s[H_s(X)]$, then make $CG_i[H_i(X)] = CG_s[H_s(X)]$.

It is determined that the count value of the target counter in the t-th counter group changes, wherein an entry Y is already stored in a Hash table position corresponding to the target counter, and a Hash calculation result acquired by calculating based on the entry Y according to the t-th Hash function is the Hash table position corresponding to the target counter, $1 \leq t \leq k$.

Whether count values of k−1 counters corresponding to k−1 Hash calculation results other than the Hash calculation result $H_t(Y)$ corresponding to the entry Y satisfy an entry insertion rule is detected.

If the count values of the k−1 counters corresponding to the k−1 Hash calculation results other than the Hash calculation result $H_t(Y)$ corresponding to the entry Y do not satisfy the entry insertion rule, the count values of all the counters which are not satisfied are increased so as to enable the entry Y to satisfy the entry insertion rule, and the operations are repeatedly executed until entries stored in Hash table positions corresponding to all the counters of which the count values have changed comply with the entry insertion rule, wherein the entry insertion rule is: if i<s, $CG_i[H_i(X)] > CG_s[H_s(X)]$ should be satisfied; and if i>s, $CG_i[H_i(X)] \geq CG_s[H_s(X)]$ should be satisfied.

In the present embodiment, assuming that the entry X is an entry to be inserted, calculation is performed based on the entry X according to k Hash functions to acquire k Hash results which are denoted as Hk(X). It is feasible to sequentially traverse the Hs(X)-th counter of the s-th counter group so as to find the counter with a smallest count value, and a Hash table position corresponding to the counter with the smallest count value is a target storage position. If there are multiple counters with the smallest count value, a position corresponding to a smaller Hash result is selected as the target position. If the target position is not empty, collision-triggered relocation is executed so as to find an empty position, and the counter groups are maintained so as to satisfy the described entry insertion rule.

The data insertion part includes the following operations 1 to 6.

At operation 1, each entry in a current sample is inserted one by one, and the flow continues to operation 2 to perform the insertion.

At operation 2, according to k Hash functions preset by a classifier, Hash calculation results of the current packet to be inserted are calculated, and k corresponding positions in a Hash table are found.

At operation 3, whether the k positions are empty is queried, and if no empty position exists, the flow proceeds to operation 4, otherwise, the flow proceeds to operation 5.

At operation 4, an index tree is respectively constructed for the entries stored in the k positions, the existing entries are moved by using collision-triggered relocation means in a cuckoo Hashing method, so as to empty one of the k positions, if successful, the flow proceeds to operation 5; otherwise, all the operations are withdrawn, and an insertion failure result is returned.

The operation 4 includes the following operations **4*a* to 4*e***.

At operation **4*a***, *k* index trees and root nodes thereof are constructed, wherein the k root nodes are respectively linked to k positions (all of the k positions are occupied) acquired by the Hash calculation.

At operation **4*b*, starting from the first tree, each tree grows by one layer, for example, Hash calculation is performed according to the rule stored in the Hash table position linked to each leaf node, the remaining k−1 positions except the current position are found, and child nodes are respectively created. Once an empty position is found in a leaf node newly grown in a certain tree, the flow proceeds to operation 4*d***.

At operation **4*c*, operation 4*b* is repeated so as to grow one layer each time, until finding an empty position or the height of the tree reaches a preset upper limit; if an empty position is found, the flow proceeds to operation 4*d***; otherwise, a lookup failure result is returned.

At operation **4*d*, taking the leaf node as an initial node, a rule stored in the position pointed to by the parent node is moved to the position of the current node, whether the rule can be moved is determined according to whether the maintenance of the counter groups is successful or not, and if successful, the flow proceeds to operation 4*e***; otherwise, all the relocation operations already performed are withdrawn, and a lookup failure result is returned.

At operation 4*e*, taking the parent node of the node in the previous operation as a new initial node, operation 4*d* is repeated until a failure is returned halfway or the flow successfully proceeds to the root node, in this case, the Hash table position pointed to by the root node has been emptied, and the position information is returned.

At operation 5, assuming that the entry can be stored in the found empty position, the counter groups are maintained, so as to ensure that the correctness of the lookup for the existing entries in the table will not be affected after the current entry is inserted; if the maintenance is successful, the flow proceeds to operation 6; otherwise, all operations are withdrawn, and an insertion failure result is returned.

Exemplarily, the operation of maintaining the counter groups in operation 5 includes the following operations 5*a* to 5*c*.

At operation 5*a, k* Hash functions correspond to k counter groups, the k counter groups are respectively denoted as CG1, . . . , CGK, and the number of counters contained in each of the counter groups is equal to a capacity of the Hash table. It is assumed that the results acquired by performing calculation on an entry X according to k Hash functions are respectively denoted as Hi(X), where $1 \le i \le k$. It is assumed that the count value of the m-th counter in the p-th counter group is denoted as CGp[m]. Assuming that the Hash function adopted for determining the position where the current entry X is inserted is Hs ($1 \le s \le k$), then it is necessary to perform judgment based on CGi[Hi(X)] ($1 \le i \le k$, and $i \ne s$). If $i \le s$, and $CGi[Hi(X)] \le CGs[Hs(X)]$, then make $CGi[Hi(X)] = CGs[Hs(X)]+1$; if $i > s$ and $CGi[Hi(X)] < CGs[Hs(X)]$, then make $CGi[Hi(X)] = CGs[Hs(X)]$. If the count values after the maintenance exceeds the upper limit of the counter, all the counter operations are withdrawn (i.e., rolled back), and a failure result is returned.

At operation 5*b*, for each counter whose value is changed, whether there is an entry stored in the address of the Hash table is checked one by one, and if there is no entry stored, the maintenance flow is skipped; if the Hash number used to store the entry is different from the counter group number where the counter is located, the maintenance flow is skipped; otherwise, the flow proceeds to operation 5*c*, until the judgment for all the counters has been completed, or the collision of the counter group has reached an upper limit, or the count value of the counter has reached an upper limit. If all the processing is completed, a success result is returned; otherwise, all the counter operations are withdrawn (i.e., rolled back), and a failure result is returned.

At operation 5*c*, judgment is performed on the entry stored in the address corresponding to the counter, assuming that the entry stored is entry Y, and a current position is an address Ht(Y) acquired by calculating based on the entry Y according to the t-th Hash function, where $1 \le t \le k$. Similar to operation 5*a*, the k−1 counters associated with the entry Y are judged and maintained to ensure that Ht(Y) has the smallest numerical value (count value) among all the counters associated with the entry Y, or that Ht(Y) has the smallest Hash function number among multiple counters having the smallest numerical value (count value). If the change of Ht(Y) does not result in a change in the remaining k−1 counters of the entry Y, the flow returns to operation 5*b* to continue processing the remaining counters; otherwise, the affected counter is processed according to operation 5*b*, and then the flow returns to operation 5*b* to continue processing the remaining counters.

At operation 6, the entry is inserted into the empty position, and an insertion success result is returned.

The data query part includes the following operations:

extracting a key value of a packet, which is denoted as Z;

according to k Hash functions preset by a classifier, calculating k Hash calculation results corresponding to Z, wherein the k Hash calculation results are denoted as Ht(Z), $1 \le t \le k$;

sequentially acquiring a count value CG1(H1(Z)) of a counter with the address H1(Z) in the first counter group, a count value CG2(H2(Z))) of a counter with the address H2(Z) in the second counter group, . . . , and a count value CGK (Hk(Z)) of a counter with the address Hk(Z) in the k-th counter group; comparing the magnitudes of these count values to acquire a counter group number of a counter group having the counter with the smallest count value, and recording the counter group number as m, then $$CGm(Hm(Z)) = \min\{CG1(H1(Z)), CG2(H2(Z))), \ldots , CGk(Hk(Z))\},\ 1 \le m \le k;$$

furthermore, when the count values of multiple counters are equal, selecting a counter group with the smallest counter group number;

according to the address Hm (Z), indexing an entry T at a corresponding position of an off-chip memory, and reading the entry T into the chip;

accurately comparing the key value Z with the entry T to determine whether the key value Z is exactly equal to the entry T, and if the key value Z is equal to the entry T, returning a result of matching, and ending the current lookup process; otherwise, returning a result of not matching, and ending the current lookup process.

By means of the embodiment, the difficulty that the storage utilization rate and the lookup efficiency cannot be given enough considerations in the existing on-chip and off-chip Hash algorithm is overcome, and the problem that the existing on-chip and off-chip Hash algorithm may need to access the off-chip memory many times for each lookup is solved on the premise that the off-chip storage efficiency is ensured. The method and apparatus of the embodiments of the present disclosure adopt an improved Bloom filter structure, realize that a single lookup only needs one off-chip access, greatly improve the lookup rate and stability of the existing algorithm, and greatly improve the storage utilization rate compared with a traditional Hash algorithm.

In the following exemplary embodiment, it is assumed that the number of the Hash functions used by the apparatus is 3, the Hash functions are H1, H2, and H3 respectively, and the counter groups are CG1, CG2, and CG3 respectively. However, the implementation of the present disclosure is not limited to this exemplary configuration, and the number of the Hash functions may be changed to other values.

Figure 3:
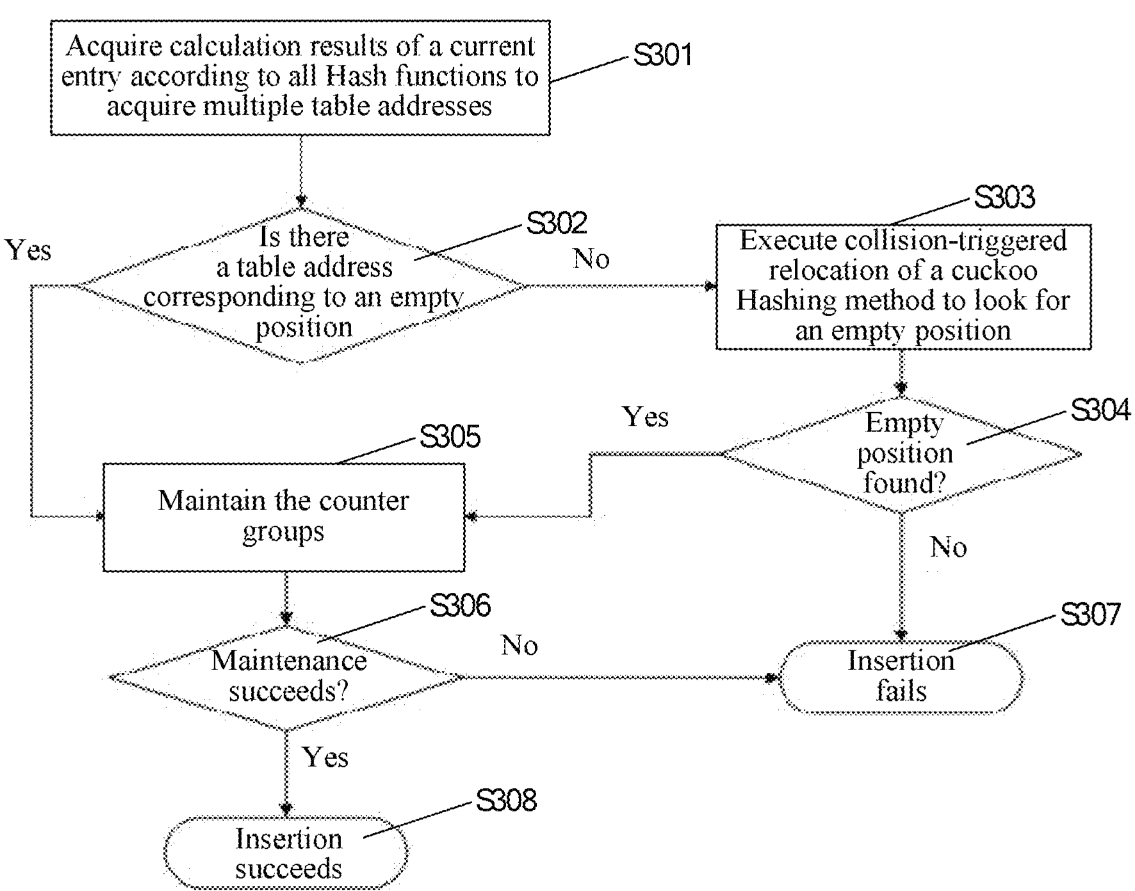
FIG. 3 is a flowchart of inserting an entry into a Hash table according to an embodiment of the present disclosure.

FIG. 3 is a flowchart of inserting an entry into a Hash table according to an embodiment of the present disclosure. As shown in FIG. 3, the flow includes the following operations S301 to S308.

At operation S301, calculation results for a current entry based on all Hash functions are acquired to acquire multiple table addresses.

At operation S302, whether there is a table address that corresponds to an empty position is determined, if so, operation S305 is executed, and if not, operation S303 is executed.

At operation S303, collision-triggered relocation of a cuckoo Hashing method is executed to look for an empty position.

At operation S304, whether an empty position is found is judged, if the judgment result is positive, operation S305 is executed, and if the judgment result is negative, operation S307 is executed.

At operation S305, the counter groups are maintained.

At operation S306, whether the maintenance is successful is judged, and if the judgment result is negative, operation S307 is executed, and if the judgment result is positive, operation S308 is executed.

At operation S307, the insertion fails.

At operation S308, the insertion succeeds.

If there are three Hash functions, the process of inserting the entry into the Hash table exemplarily includes the following operations 1 to 6.

At operation 1, each entry in a current sample is inserted one by one, and the flow continues to operation 2 to perform the insertion.

At operation 2, according to the three Hash functions preset by a classifier, Hash calculation results of the current packet to be inserted are calculated, and three corresponding positions in a Hash table are found.

At operation 3, whether the three positions are empty is queried, and if no empty position exists, the flow proceeds to operation 4, otherwise, the flow proceeds to operation 5.

At operation 4, an index tree is respectively constructed for the entries stored in the three positions, the existing entries are moved by using collision-triggered relocation means in a cuckoo Hashing method, so as to empty one of the three positions, if successful, the flow proceeds to operation 5; otherwise, all the operations are withdrawn, and an insertion failure result is returned.

At operation 5, assuming that the entry can be stored in the found empty position, the counter groups are maintained, so as to ensure that the correctness of the lookup for the existing entries in the table will not be affected after the current entry is inserted; if the maintenance is successful, the flow proceeds to operation 6; otherwise, all operations are withdrawn, and an insertion failure result is returned.

At operation 6, the entry is inserted into the empty position, and an insertion success result is returned.

Figure 4:
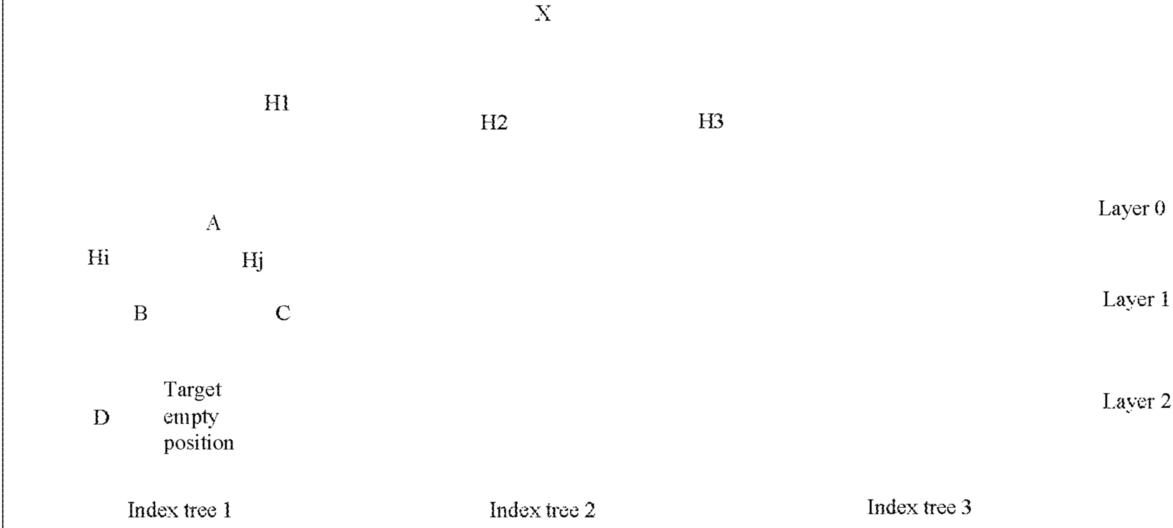
FIG. 4 is a schematic diagram of constructing an index tree to look for an empty position according to an embodiment of the present disclosure.

In the above operation 3, FIG. 4 is a schematic diagram of constructing an index tree to look for an empty position according to an embodiment of the present disclosure. As shown in FIG. 4, when a new entry is inserted, if the three Hash addresses all point to non-empty positions, index trees are constructed by taking the entry stored in each position as a root node of a respective index tree. When a current node is growing, the child nodes of the current node are nodes at the Hash addresses other than the current position calculated for the entry at the position of the current node. Because the number of the Hash functions is 3, each node has at most two child nodes. The three index trees are constructed layer by layer until an empty position is found or the number of layers of the index tree reaches a preset upper limit.

Taking FIG. 4 as an example, three addresses may be acquired through Hash calculation based on the entry X, but all the three addresses are occupied, then three index trees are constructed by taking the three addresses as root nodes of the respective index trees. Taking the index tree 1 as an example, an entry A is stored at the address of the root node, two other Hash addresses of the entry A are calculated to find an entry B and an entry C, and therefore two child nodes newly created in the first layer respectively point to the two addresses. Similarly, the first layer of child nodes continues to grow in the indexing tree 2 and the indexing tree 3. However, the positions pointed to by the corresponding addresses of all nodes are not empty, then the second layer of child nodes begins to grow from the indexing tree 1. Among the two child nodes of the node of entry B, there is one empty position, this empty position is marked as a target empty position, and the growth of all index trees stops.

Here, the number of layers of the tree represents the number of times that the collision-triggered relocation in the cuckoo Hashing method needs to be performed subsequently, and the relocation process is indexed from a leaf node of the tree to a root node of the tree.

Figure 5:
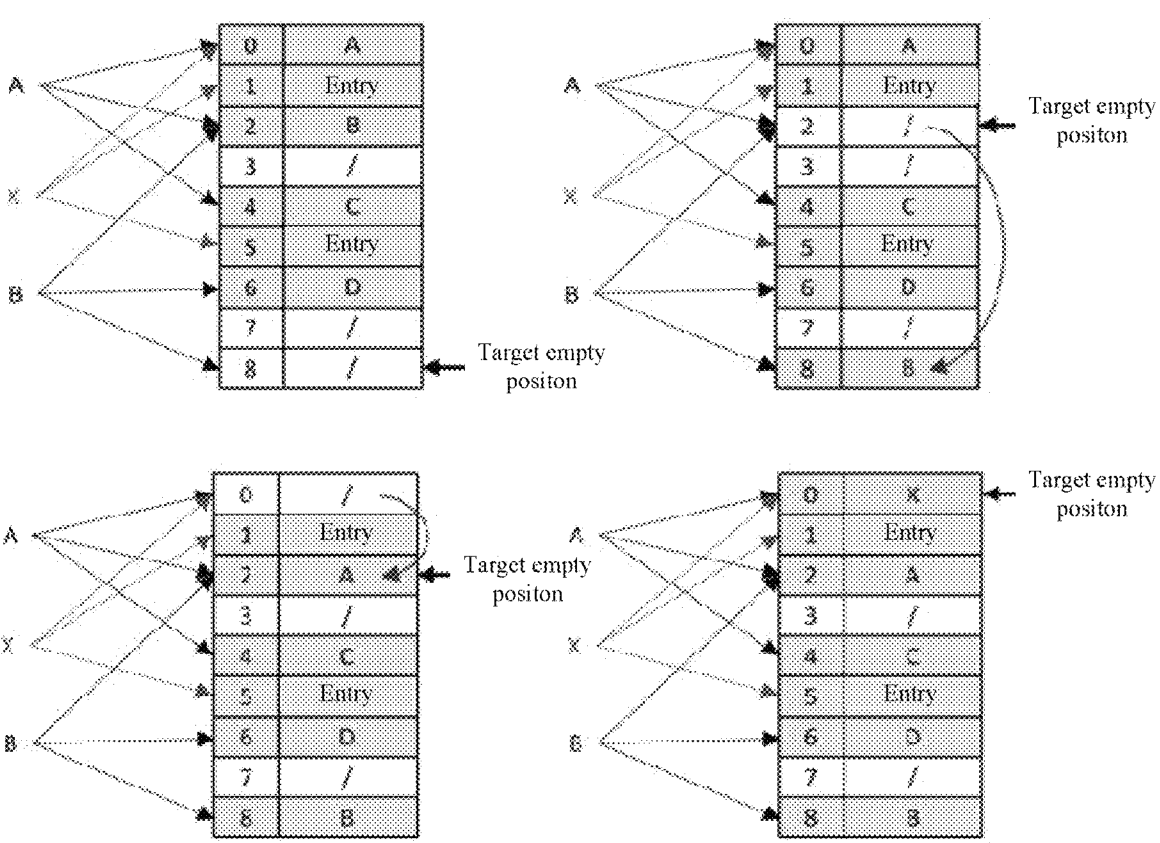
FIG. 5 is a schematic diagram of collision-triggered relocation in an index tree-based cuckoo Hashing method according to an embodiment of the present disclosure.

In the foregoing operation 4, FIG. 5 is a schematic diagram of entry transferring upon collision in an index tree-based cuckoo Hashing method according to an embodiment of the present disclosure. As shown in FIG. 5, corresponding relocation (movement of the entry) needs to be performed in the Hash table according to the target empty position and the corresponding tree branches shown in FIG. 4. For example, the entry B is first moved to the target empty position, i.e., the address 8; after the entry B is moved, the position pointed to by the address 2 becomes a new target empty position, and the entry A is subsequently moved to the address 2; after the entry A is moved, the position pointed to by the address 0 is empty, and finally the entry X is inserted into the address 0.

This process uses the principle of cuckoo Hashing method, but the relocation is not performed between different Hash tables, but is performed within the same Hash table according to different Hash functions, which also improves the filling rate of the Hash table and alleviates the problem of high collision probability of the Hash table.

Figure 6:
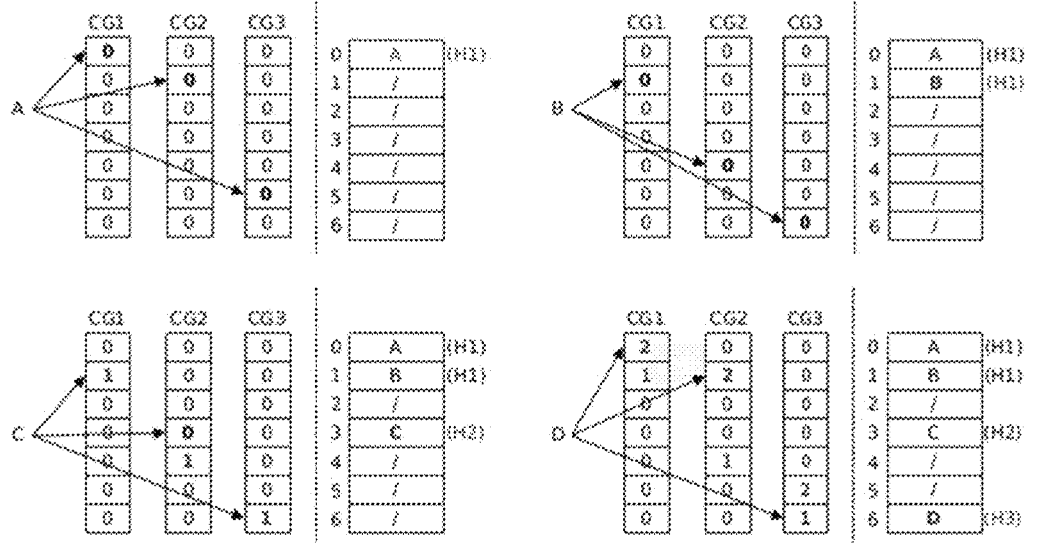
FIG. 6 is a schematic diagram of a process of maintaining a counter group according to an embodiment of the present disclosure.

In the foregoing operation 5, FIG. 6 is a schematic diagram of a process of maintaining a counter group according to an embodiment of the present disclosure. As shown in FIG. 6, taking three Hash functions as an example, the capacity of a Hash table is 7, and entries A, B, C, and D are sequentially inserted into the apparatus of the present embodiment.

Initially, all counters in the counter groups CG1, CG2, and CG3 are initialized to have a count value of 0.

When the entry A is inserted, addresses 0, 1, and 5 are calculated by using the Hash functions, and respectively correspond to three counters CG1[0], CG2[1], and CG3[5] in the counter groups, wherein the three addresses all point to empty positions. The numerical values (count values) of the three counters are compared, for the case in the present example, CG1[0]=CG2[1]=CG3[5], therefore the Hash address corresponding to the CG1 counter with the smallest Hash function number has the highest priority, and the entry A is stored at address 0.

When the entry B is inserted, addresses 1, 4, and 6 are calculated by using the Hash functions, and respectively correspond to three counters CG1[1], CG2[4], and CG3[6] in the counter groups, wherein the three addresses are all empty. Similarly, the entry B is stored at address 1.

When the entry C is inserted, addresses 1, 3 and 6 are calculated by using the Hash functions, and respectively correspond to three counters CG1[1], CG2[3] and CG3[6] in the counter groups, wherein the address 1 points to a non-empty position, and the addresses 3 and 6 point to empty positions. In this case, the entry C is stored in the address 3, and 1 is added to the count value of the CG1[1], so as to ensure that the CG2[3] has the highest priority at this time. However, the increase of the count value of CGI [1] has an impact on the existing entry B. In order to ensure a correct lookup for the entry B, the count values of the other two counters corresponding to the entry B also need to be increased by 1, that is, the count values of CG2[4] and CG3[6] are increased by 1, respectively.

When the entry D is inserted, addresses 0, 1, and 6 are calculated by using the Hash functions, and respectively correspond to three counters CG1[0], CG2[1], and CG3[6] in the counter groups, wherein addresses 0 and 1 point to non-empty positions, and address 6 points to an empty position. In this case, the entry D is stored into address 6, while the count values of CG1[0] and CG2[1] are increased by 2 to ensure that CG3[6] has a smallest value. However, the increase of the count value of CG1[0] has an impact on the existing entry A. In order to ensure a correct lookup for the entry A, the other two corresponding counters of the entry A also need to be increased to 2, i.e., the count values of CG2[1] and CG3[5] are adjusted to 2.

In this way, the entries A~D have all been inserted into the Hash table, and the lookup condition (the entry is always stored in the table address corresponding to the counter with the smallest numerical value (count value); and if the count values are the same, the entry is always stored in the table address corresponding to the counter with the smallest Hash function number) is satisfied.

Figure 7:
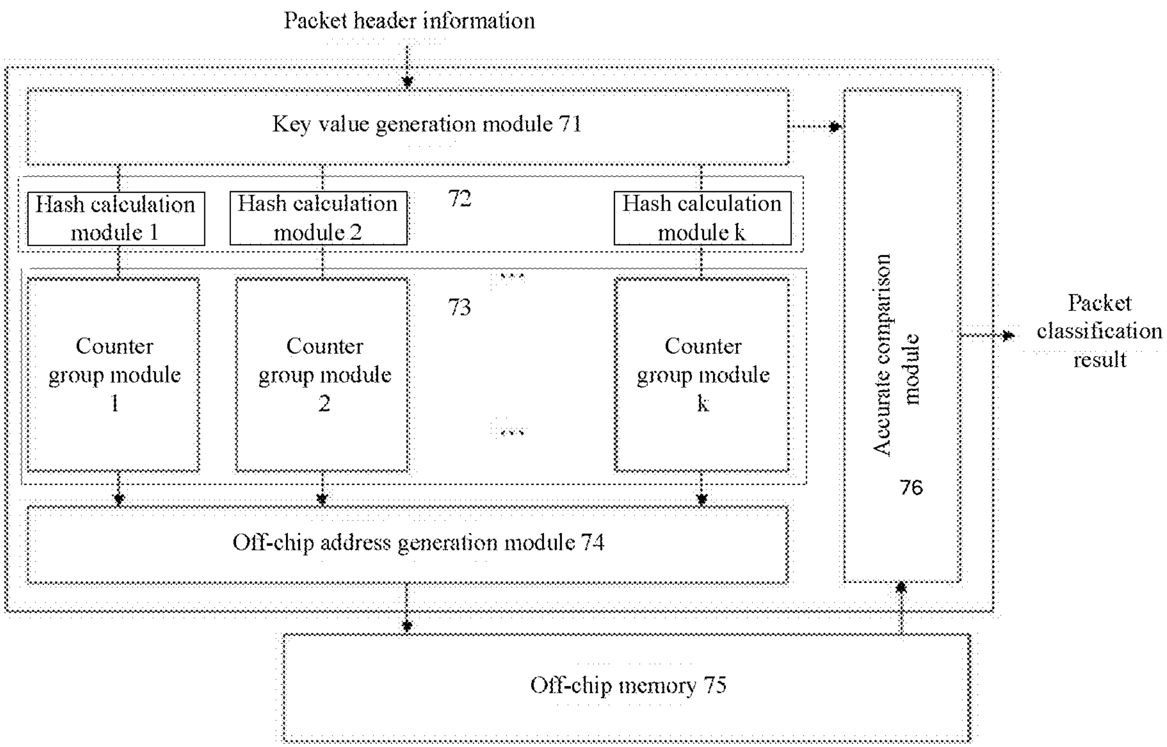
FIG. 7 is a block diagram of hardware modules according to an embodiment of the present disclosure.

FIG. 7 is a block diagram of hardware modules according to an embodiment of the present disclosure. As shown in FIG. 7, the hardware module includes: a key value generation module 71, Hash calculation modules 72, counter group modules 73, an off-chip address generation module 74, an off-chip memory 75 and an accurate comparison module 76. When lookup is performed, firstly, the key value generation module 71 extracts a key value from header information of a packet, wherein an information format of the key value extracts is adapted to a sample stored in a current apparatus; and distribute the generated key value information to all Hash calculation modules 72. The corresponding counter group module 73 is respectively indexed with an output result of each Hash calculation module 72 as an address, so as to acquire multiple pieces of counter information. The multiple pieces of counter information are sent to the off-chip address generation module 74, and a rule of the off-chip address generation is: selecting a counter with the smallest count value and the smallest counter "group number", and determining the address number corresponding to the selected counter as an index address of the off-chip memory 75, and entry information stored in the off-chip memory 75 is read by using the index address. Finally, the accurate comparison module 76 accurately compares the entry information returned by the off-chip memory with the extracted key value to acquire a final matching result.

Figure 8:
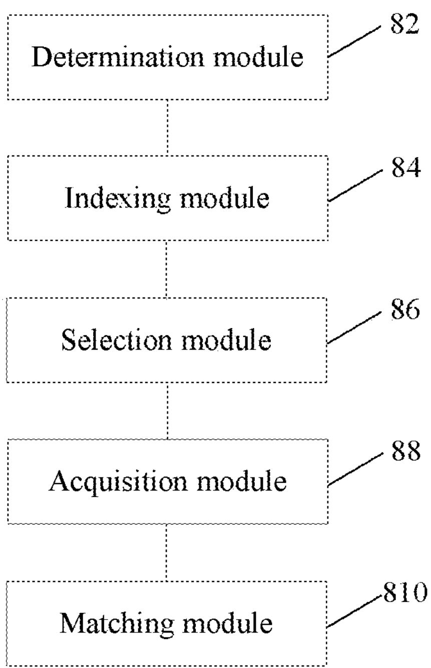
FIG. 8 is a block diagram of a packet matching apparatus according to an embodiment of the present disclosure.

According to another embodiment of the present disclosure, a packet matching apparatus is also provided. FIG. 8 is a block diagram of a packet matching apparatus according to an embodiment of the present disclosure. As shown in FIG. 8, the packet matching apparatus includes:

- a determination module 82, configured to determine multiple Hash calculation results corresponding to a key value of a packet;
- an indexing module 84, configured to index addresses in multiple counter groups respectively according to the multiple Hash calculation results, so as to determine multiple counters, wherein one counter is indexed in one counter group;
- a selection module 86, configured to determine one target counter from the multiple counters;
- an acquisition module 88, configured to acquire a target entry at a corresponding position of an off-chip memory according to the address of the target counter; and
- a matching module 810, configured to determine, in a case where the target entry is equal to the key value, that the packet matches the target entry.

In an exemplary embodiment, the selection module 86 is further configured to:

- sequentially extract count values of the multiple counters;
- determine a counter with a smallest count value from the multiple counters;
- in a case where there is only one counter with the smallest count value, determine the counter with the smallest count value as the target counter; and
- in a case where there are multiple counters with the smallest count value, determine a unique counter from the multiple counters according to a state of each counter group as the target counter.

In an exemplary embodiment, the determination module 82 is further configured to:

- extract the key value of the packet; and
- determine, according to multiple Hash functions preset by a classifier, the multiple Hash calculation results corresponding to the key value, wherein one Hash function is used for determining one Hash calculation result.

In an exemplary embodiment, the apparatus may further include:

- a second acquisition module, configured to acquire multiple Hash calculation results of an entry to be inserted, wherein the multiple Hash calculation results are determined according to multiple Hash functions preset by a classifier, one Hash function is used for determining one Hash calculation result, and one Hash function corresponds to one counter group; and
- an inserting module, configured to insert the entry to be inserted into an empty position in a Hash table according to the multiple Hash calculation results, and maintaining the multiple counter groups, wherein the number of counters contained in each counter group is equal to a capacity of the Hash table, the addresses of counters in each counter group are respectively in one-to-one correspondence with Hash table positions in the Hash table, and the addresses of the counters are the Hash calculation results.

In an exemplary embodiment, the inserting module includes:

- an indexing sub-module, configured to index the addresses in the multiple counter groups according to the multiple Hash calculation results, so as to determine multiple counters, wherein one Hash calculation result corresponds to one counter in one counter group;
- a selection sub-module, configured to select, from the multiple counters, one target counter which corresponds to an empty position in the Hash table; and
- an inserting sub-module, configured to insert the entry to be inserted into the empty position in the Hash table corresponding to the address of the target counter.

In an exemplary embodiment, the selection sub-module includes:

- a selection unit, configured to, in a case where the addresses of the multiple counters all correspond to empty positions in the Hash table, selecting, from the multiple counters, one target counter with a smallest count value; and a moving unit, configured to, in a case where the addresses of the multiple counters all correspond to non-empty positions in the Hash table, execute collision-triggered relocation to acquire one target empty position after the collision-triggered relocation, and determining a counter corresponding to the target empty position as the target counter.

In an exemplary embodiment, the insertion module is further configured to:

acquiring a Hash calculation result H(X) of a target empty position into which the entry to be inserted is inserted, wherein 1≤s≤k, and k is the number of the multiple Hash functions;

sequentially acquiring the $H_s(X)$-th counter of the s-th counter group to acquire k counters;

in a case where the target empty position is able to be uniquely determined according to the count values of the k counters or according to other characteristic values, except the count values, in current states of the k counter groups, determining not to maintain the multiple counter groups; and in a case where the target empty position is not able to be uniquely determined according to the count values of the k counters or according to other characteristic values, except the count values, in the current states of the k counter groups, adjusting the count values of one or more counters, so that the count values of the counters after the adjustment satisfy an entry insertion rule;

in a case where insertion of the entry X results in a change of the count value of the counter, checking whether an entry stored in a Hash table position corresponding to the counter whose count value has changed still satisfies the entry insertion rule;

in a case where the entry stored in a Hash table position corresponding to the counter whose count value has changed still does not satisfy the entry insertion rule, repeatedly performing the operation of maintaining the counter for the entry stored in the Hash table position corresponding to the counter whose count value has changed, until all entries stored in the positions in the Hash table corresponding to the counters whose count values have changed satisfy the entry insertion rule. In an exemplary embodiment, the entry insertion rule is:

sequentially acquiring the $H_s(X)$-th counter of the s-th counter group to acquire the k counters, wherein 1≤s≤k, and k is the number of the multiple Hash functions;

determining, according to the count values of the k counters and other characteristic values, except the count values, in the current states of the k counter groups, a unique Hash function number used when storing the entry, and determining a unique storage position of the entry by using the Hash calculation result of the Hash function corresponding to the Hash function number.

Embodiments of the present disclosure also provide a computer-readable storage medium. The computer-readable storage medium stores a computer program, wherein the computer program, when running on a processor, causes the processor to execute the operations in any one of the described method embodiments.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

Embodiments of the present disclosure further provide an electronic device, including a memory and a processor. The memory stores a computer program. The processor is configured to run the computer program to execute operations in any one of the method embodiments.

In an exemplary embodiment, the electronic device may further include a transmission device and an input/output device, wherein the transmission device is connected to the processor, and the input/output device is connected to the processor.

For examples in the present embodiment, reference may be made to the examples described in the foregoing embodiments and exemplary embodiments, and details are not repeatedly described in the present embodiment.

Obviously, those having ordinary skill in the art should understand that each module or each operation of the present disclosure can be implemented by a universal computing device, they may be centralized on a single computing device or distributed on a network composed of multiple computing devices, they can be implemented by program codes executable by a computing apparatus, and thus can be stored in a storage apparatus and executed by the computing apparatus, Furthermore, in some cases, the shown or described operations may be executed in an order different from that described here, or they are made into integrated circuit modules respectively, or multiple modules or operations therein are made into a single integrated circuit module for implementation. As such, the present disclosure is not limited to any particular hardware and software combination.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A packet matching method performed by a network device, comprising:

determining multiple Hash calculation results corresponding to a key value of a packet;

indexing addresses in multiple counter groups respectively according to the multiple Hash calculation results, so as to determine multiple counters, wherein one counter is indexed in one counter group;

determining one target counter from the multiple counters;

acquiring a target entry at a corresponding position of an off-chip memory according to the address of the target counter;

in a case where the target entry is equal to the key value, determining that the packet matches the target entry;

wherein determining the target counter from the multiple counters comprises:

sequentially extracting count values of the multiple counters;

determining a counter with a smallest count value from the multiple counters;

in a case where there is only one counter with the smallest count value, determining the counter with the smallest count value as the target counter; and in a case where there are multiple counters with the smallest count value, determining a unique counter from the multiple counters according to a state of each counter group as the target counter.

2. The method according to claim 1, wherein determining the multiple Hash calculation results corresponding to the key value of the packet comprises:

extracting the key value of the packet; and determining, according to multiple Hash functions preset by a classifier, the multiple Hash calculation results corresponding to the key value, wherein one Hash function is used for determining one Hash calculation result.

3. The method according to claim 1, wherein before determining the multiple Hash calculation results corresponding to the key value of the packet, the method further comprises:

acquiring multiple Hash calculation results of an entry to be inserted, wherein the multiple Hash calculation results are determined according to multiple Hash functions preset by a classifier, one Hash function is used for determining one Hash calculation result, and one Hash function corresponds to one counter group; and inserting the entry to be inserted into an empty position in a Hash table according to the multiple Hash calculation results, and maintaining the multiple counter groups, wherein the number of counters contained in each counter group is equal to a capacity of the Hash table, the addresses of counters in each counter group are respectively in one-to-one correspondence with Hash table positions in the Hash table, and the addresses of the counters are the Hash calculation results.

4. The method according to claim 3, wherein inserting the entry to be inserted into the empty position in the Hash table according to the multiple Hash calculation results comprises:

indexing the addresses in the multiple counter groups according to the multiple Hash calculation results, so as to determine multiple counters, wherein one Hash calculation result corresponds to one counter in one counter group;

selecting, from the multiple counters, one target counter which corresponds to an empty position in the Hash table; and inserting the entry to be inserted into the empty position in the Hash table corresponding to the address of the target counter.

5. The method according to claim 4, wherein selecting, from the multiple counters, one target counter which corresponds to an empty position in the Hash table comprises:

in a case where the addresses of the multiple counters all correspond to empty positions in the Hash table, selecting, from the multiple counters, one target counter with a smallest count value;

in a case where the addresses of the multiple counters all correspond to non-empty positions in the Hash table, executing collision-triggered relocation to acquire one target empty position after the collision-triggered relocation, and determining a counter corresponding to the target empty position as the target counter.

6. The method according to claim 5, wherein executing the collision-triggered relocation to acquire one target empty position after the collision-triggered relocation comprises:

constructing index trees for entries stored in k positions in the Hash table respectively, so as to acquire k index trees, wherein root nodes of the index trees are linked to k positions in the Hash table corresponding to the Hash calculation results; and moving a stored entry from the Hash table position corresponding to the root node of one index tree among the k index trees through cuckoo Hashing collision, so as to empty one of the k positions to acquire the target empty position.

7. The method according to claim 6, wherein moving the stored entry from the Hash table position corresponding to the root node of one index tree among the k index trees through cuckoo Hashing collision, so as to empty one of the k positions to acquire the target empty position comprises:

starting from the first index tree of the k index trees, repeatedly controlling each index tree to grow a layer of leafs to acquire k−1 leaf nodes, until an empty position is acquired from the leaf nodes, wherein a Hash table position corresponding to each leaf node in each index tree is a Hash calculation result acquired by calculating based on an entry stored in a Hash table position corresponding to a parent node of the leaf node, the k−1 leaf nodes respectively correspond to k−1 Hash calculation results other than the Hash calculation result at a current position acquired by calculating based on the entry stored at the position of the parent node of the k−1 leaf nodes;

moving the entry stored in the Hash table position corresponding to the parent node to the empty position, so as to empty the Hash table position corresponding to the parent node;

in a case where the parent node, serving as a current node, has a parent node, moving an entry stored in a Hash table position corresponding to the parent node of the current node to the empty Hash table position corresponding to the current node;

repeating the moving from bottom layer to top layer until the Hash table position corresponding to the root node is empty, so as to acquire the target empty position.

8. The method according to claim 6, wherein executing the collision-triggered relocation to acquire one target empty position after the collision-triggered relocation further comprises:

according to count values of the k counters corresponding to an entry X to be inserted and other characteristic values of the current states of the counter groups, determining a unique Hash function number and a unique Hash table position, evicting an entry Y stored in the Hash table position, and marking the Hash table position;

determining the remaining k−1 Hash calculation results of the entry Y, and in a case where there is an empty position, sequentially moving the entry Y to the empty position; otherwise, according to the count values of the k−1 counters of the entry Y and other characteristic values of the current states of the counter groups, determining a unique Hash function number and a unique Hash table position, and evicting an entry stored in the Hash table position, continuing executing the collision-triggered relocation until an empty position is found, and determining that the position before the entry Y is evicted is the target empty position, wherein during the collision-triggered relocation, the entry is not allowed to be moved to the marked Hash table position.

9. The method according to claim 3, wherein maintaining the multiple counter groups comprises:

acquiring a Hash calculation result $H_s(X)$ of a target empty position into which the entry to be inserted is inserted, wherein $1 \le s \le k$, and k is the number of the multiple Hash functions;

sequentially acquiring the $H_s(X)$-th counter of the s-th counter group to acquire k counters;

in a case where the target empty position is able to be uniquely determined according to the count values of the k counters or according to other characteristic values, except the count values, in current states of the k counter groups, determining not to maintain the multiple counter groups; and in a case where the target empty position is not able to be uniquely determined according to the count values of the k counters or according to other characteristic values, except the count values, in the current states of the k counter groups, adjusting the count values of one or more counters, so that the count values of the counters after the adjustment satisfy an entry insertion rule;

in a case where insertion of the entry X results in a change of the count value of the counter, checking whether an entry stored in a Hash table position corresponding to the counter whose count value has changed still satisfies the entry insertion rule;

in a case where the entry stored in a Hash table position corresponding to the counter whose count value has changed still does not satisfy the entry insertion rule, repeatedly performing the operation of maintaining the counter for the entry stored in the Hash table position corresponding to the counter whose count value has changed, until all entries stored in the positions in the Hash table corresponding to the counters whose count values have changed satisfy the entry insertion rule.

10. The method according to claim 9, wherein the entry insertion rule is:

sequentially acquiring the $H_s(X)$-th counter of the s-th counter group to acquire the k counters, wherein $1 \le s \le k$, and k is the number of the multiple Hash functions;

determining, according to the count values of the k counters and other characteristic values, except the count values, in the current states of the k counter groups, a unique Hash function number used when storing the entry, and determining a unique storage position of the entry by using the Hash calculation result of the Hash function corresponding to the Hash function number.

11. The method according to claim 1, wherein the state of the counter group comprises: a counter group number, a Hash function number, an address number of the counter in the counter group, and a Hash function result.

12. The method according to claim 11, wherein in the case where there are multiple counters with the smallest count value, determining the unique counter from the multiple counters according to the state of each counter group as the target counter comprises:

determining a counter with a smallest counter group number or a smallest Hash function number among the multiple counters with the smallest count value as the target counter, or determining a counter with a smallest address number in the counter group or a smallest Hash function result among the multiple counters with the smallest count value as the target counter.

13. A non-transitory computer-readable storage medium, wherein the non-transitory computer-readable storage medium stores a computer program, and the computer program, when running on a processor, causes the processor to execute following operations:

determining multiple Hash calculation results corresponding to a key value of a packet;

indexing addresses in multiple counter groups respectively according to the multiple Hash calculation results, so as to determine multiple counters, wherein one counter is indexed in one counter group;

determining one target counter from the multiple counters;

acquiring a target entry at a corresponding position of an off-chip memory according to the address of the target counter;

in a case where the target entry is equal to the key value, determining that the packet matches the target entry;

wherein determining the target counter from the multiple counters comprises:

sequentially extracting count values of the multiple counters;

determining a counter with a smallest count value from the multiple counters;

in a case where there is only one counter with the smallest count value, determining the counter with the smallest count value as the target counter; and in a case where there are multiple counters with the smallest count value, determining a unique counter from the multiple counters according to a state of each counter group as the target counter.

14. An electronic device, comprising; a memory and a processor, wherein the memory stores a computer program, and the processor is configured to run the computer program so as to execute following operations:

determining multiple Hash calculation results corresponding to a key value of a packet;

indexing addresses in multiple counter groups respectively according to the multiple Hash calculation results, so as to determine multiple counters, wherein one counter is indexed in one counter group;

determining one target counter from the multiple counters;

acquiring a target entry at a corresponding position of an off-chip memory according to the address of the target counter;

in a case where the target entry is equal to the key value, determining that the packet matches the target entry;

wherein determining the target counter from the multiple counters comprises:

sequentially extracting count values of the multiple counters;

determining a counter with a smallest count value from the multiple counters;

in a case where there is only one counter with the smallest count value, determining the counter with the smallest count value as the target counter; and in a case where there are multiple counters with the smallest count value, determining a unique counter from the multiple counters according to a state of each counter group as the target counter.

15. The electronic device according to claim 14, wherein determining the multiple Hash calculation results corresponding to the key value of the packet comprises:

extracting the key value of the packet; and determining, according to multiple Hash functions preset by a classifier, the multiple Hash calculation results corresponding to the key value, wherein one Hash function is used for determining one Hash calculation result.

16. The electronic device according to claim 14, wherein the processor is configured to run the computer program so as to execute following operations before determining the multiple Hash calculation results corresponding to the key value of the packet:

acquiring multiple Hash calculation results of an entry to be inserted, wherein the multiple Hash calculation results are determined according to multiple Hash functions preset by a classifier, one Hash function is used for determining one Hash calculation result, and one Hash function corresponds to one counter group; and inserting the entry to be inserted into an empty position in a Hash table according to the multiple Hash calculation results, and maintaining the multiple counter groups, wherein the number of counters contained in each counter group is equal to a capacity of the Hash table, the addresses of counters in each counter group are respectively in one-to-one correspondence with Hash table positions in the Hash table, and the addresses of the counters are the Hash calculation results.

17. The electronic device according to claim 16, wherein inserting the entry to be inserted into the empty position in the Hash table according to the multiple Hash calculation results comprises:

indexing the addresses in the multiple counter groups according to the multiple Hash calculation results, so as to determine multiple counters, wherein one Hash calculation result corresponds to one counter in one counter group;

selecting, from the multiple counters, one target counter which corresponds to an empty position in the Hash table; and inserting the entry to be inserted into the empty position in the Hash table corresponding to the address of the target counter.

18. The electronic device according to claim 17, wherein selecting, from the multiple counters, one target counter which corresponds to an empty position in the Hash table comprises:

in a case where the addresses of the multiple counters all correspond to empty positions in the Hash table, selecting, from the multiple counters, one target counter with a smallest count value;

in a case where the addresses of the multiple counters all correspond to non-empty positions in the Hash table, executing collision-triggered relocation to acquire one target empty position after the collision-triggered relocation, and determining a counter corresponding to the target empty position as the target counter.

* * * * *